United States Patent [19]
Evoy

[11] Patent Number: 5,922,062
[45] Date of Patent: Jul. 13, 1999

[54] COMBINED IDE AND SCSI DISK CONTROLLER INTERFACE FOR COMMON HARDWARE REFERENCE PLATFORMS

[75] Inventor: David Ross Evoy, Tempe, Ariz.

[73] Assignee: VLSI Technology, Inc., San Jose, Calif.

[21] Appl. No.: 08/882,839

[22] Filed: Jun. 26, 1997

[51] Int. Cl.⁶ .................................................. G06F 13/38
[52] U.S. Cl. ........................... 710/129; 710/3; 710/62; 710/63; 712/32; 375/220; 711/112
[58] Field of Search ........................... 395/883, 309, 395/882, 800.32, 823; 360/69; 375/220; 711/112; 710/62, 63, 3, 129; 712/32

[56] References Cited

U.S. PATENT DOCUMENTS

| | | | |
|---|---|---|---|
| 4,500,933 | 2/1985 | Chan | 360/69 |
| 5,243,623 | 9/1993 | Murdock | 375/220 |
| 5,264,958 | 11/1993 | Johnson | 395/309 |
| 5,592,682 | 1/1997 | Chejlava, Jr. et al. | 395/823 |
| 5,671,376 | 9/1997 | Bucher et al. | 395/309 |
| 5,745,795 | 4/1998 | Pecone et al. | 395/882 |
| 5,768,612 | 6/1998 | Nelson | 395/800.32 |
| 5,787,290 | 7/1998 | Capps, Jr. et al. | 395/733 |

*Primary Examiner*—Ayaz R. Sheikh
*Assistant Examiner*—Frantz B. Jean
*Attorney, Agent, or Firm*—LaValle D. Ptak

[57] ABSTRACT

A universal disk controller for microprocessor systems is capable of use as a PCI interface with either SCSI drives or IDE drives. To effect selection of the appropriate one of the IDE or SCSI drives for use with the interface, a configuration logic circuit is coupled with a PCI bus master interface to select an IDE state machine or an SCSI state machine, both of which are coupled with a combined IDE/SCSI interface having common pins for connection to the appropriate IDE or SCSI drive for operation with the controller. Consequently, separate chips for providing interfaces between a PCI bus and either an IDE or an SCSI drive are not required. The system permits switching between IDE and SCSI drives according to the application with which it is being used.

8 Claims, 2 Drawing Sheets

COMBINED IDE AND SCSI DISK CONTROLLER INTERFACE FOR COMMON HARDWARE REFERENCE PLATFORMS

BACKGROUND

In the development of personal computers, two different basic drive configurations have been established. One of these is the SCSI drive used with IBM® compatible personal computers. The SCSI drive is 16 bits wide. A different drive, which is known as the IDE drive, is utilized in conjunction with Apple Computer's MacIntosh®. IDE drives typically are 8 bits wide; although various versions of IDE drives exist which are 16 bits wide. Common hardware reference platforms for IDE drives specify an 8-bit wide drive with parity interface.

Peripheral equipment employing 32-bit wide data transfer is coupled with either of the above general computer types through what is known as a PCI interface. The PCI 32-bit wide drive is widely used, and therefore requires an interface between the IDE or SCSI drives to convert the PCI 32-bit wide data to either the 16-bit wide SCSI output or 8-bit wide IDE drive configuration, and vice versa. In the past, two separate interface chips have been required for interfacing between the respective IDE or SCSI drive and a PCI bus interface. This required manufacturers of such interfaces to build two different sets of interfaces and to maintain inventories of such different sets for filling orders with the respective IDE or SCSI computer configurations.

To eliminate the necessity for maintaining inventories of two different types of disk controller interfaces, interfaces have been built with two separate chips, one dedicated to IDE interfaces and the other dedicated to SCSI interfaces, with only one of the circuits subsequently being used and being programmed at the time the interface was shipped to the customer (either IDE or SCSI). This caused one of the circuits on the interface to be unused, since the systems could not be switched between one or the other. The output pins were not common. One set was for interconnection with IDE drives; and the other set was for connection with SCSI drives. This resulted in a relatively expensive and wasteful configuration of common hardware platforms.

Because of the incompatibility of Apple Computer (IDE) and IBM compatible computer (SCSI) platforms, common hardware platforms for implementation with either of these types of systems have not been considered possible. As a consequence, system designers were required to carefully select disk controller systems designed specifically for driver support for the choice of interface for the operating systems based upon the computer platform used.

It is desirable to provide a combined IDE and SCSI disk controller for common hardware platforms interfacing with a PCI bus which is cost effective and which shares common components. An example of a platform that requires both IDE and SCSI drives is the CHRP, common hardware reference platform, as defined by the Power PC Microprocessor.

SUMMARY OF THE INVENTION

A universal disk controller for a microprocessor system is designed for use as a PCI bus interface with both SCSI drives and IDE drives. To accomplish this, configuration logic is coupled with a PCI bus master interface and has a mode control output for controlling the operating mode of the disk controller in response to configuration signals supplied to it from the bus master interface. Read and write buffer memories are coupled with the PCI bus master interface to supply data thereto and to receive data therefrom, respectively. IDE and SCSI state machines are coupled with the configuration logic to receive operating signals from it. These state machines have outputs coupled with the write and read buffer memories to control the operations of these memories in accordance with whichever one of the state machines is selected for operation by the mode control output of the configuration logic. An IDE/SCSI drive interface is coupled with the buffer memories to receive signals from the write buffer memory and to supply signals to the read buffer memory. This interface has common pins for connection to either SCSI drives or IDE drives. Mode control inputs for the write buffer memory, the read buffer memory and the IDE and SCSI state machines, along with the IDE/SCSI drive interface, are coupled with the mode control output of the configuration logic, which configures the system to operate as a buffer between either the selected IDE or SCSI drive and the PCI bus master interface.

DETAILED DESCRIPTION

Figure 1:
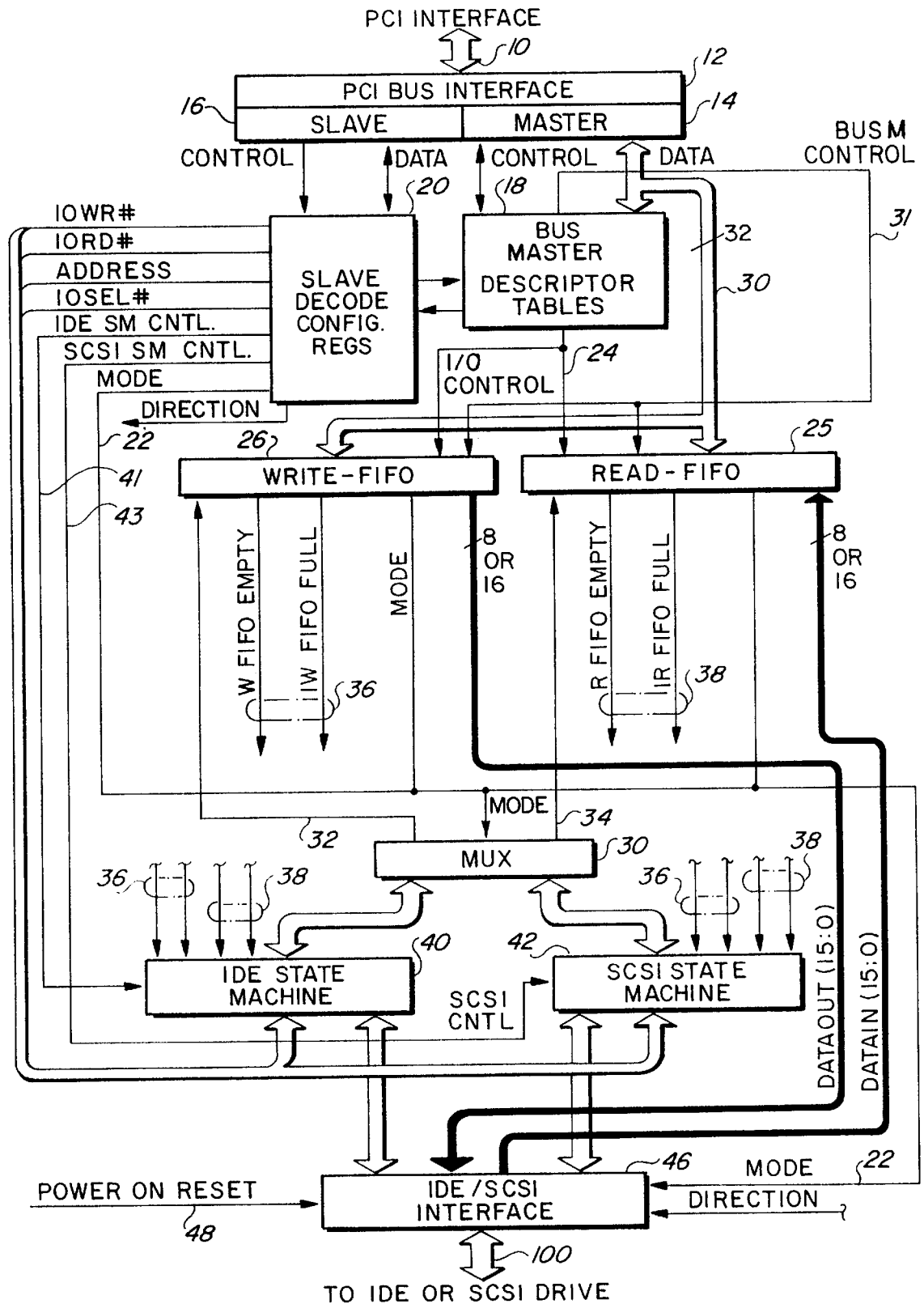
FIG. 1 is a schematic diagram of a preferred embodiment of the invention.

Reference now should be made to the drawings, in which the same reference numbers are used throughout the different figures to designate the same or similar components. The system which is shown in FIG. 1 is a common hardware reference platform (CHRP) of the type which requires multiple operating systems to be able to boot. To meet this requirement, generally it is required to supply both PC/AT peripherals and MAC peripherals. As is well known, some of these platforms, namely the PC/AT platforms, require IDE drives and some, the Apple MacIntosh® (MAC) platforms require SCSI drives. Providing both sets of hardware or two separate CHRP platforms for interfacing between the peripherals and a PCI interface or PCI bus, is expensive. The circuit shown in FIG. 1 is a universal circuit defining a single disk interface, which can be used in both applications for interfacing between a PCI bus and either IDE drives or SCSI drives.

As shown in FIG. 1, the PCI bus interface at 10 supplies 32-bit signals to the remainder of the disk controller system shown in FIG. 1. At the bottom of FIG. 1, the bus 100 is connected to either an IDE or SCSI drive. These connections are through common pins on an IDE/SCSI interface 46. The following table illustrates the suggested pin mapping for both of these types of drives:

TABLE 1

| IDE/SCSI interface | | | | | | |
|---|---|---|---|---|---|---|
| SCSI, 8 bit | | | BMIDE | | | |
| # | Name | Type | # | Name | Type | POWER UP |
| 8 | SCSI_DB[7:0] | Bi | 8 | IDED[7:0] | Bi | Tri |
| 1 | SCSI_DB[8] | Bi | 1 | IDED[8] | Bi | Tri |
| 1 | SCSI_ATN# | Bi | 1 | IDED[9] | Bi | Out, Hi |
| 1 | SCSI_FREQ# | Bi | 1 | IDED[10] | Bi | Out, Hi |
| 1 | SCSI_IX0# | Bi | 1 | IDED[11] | Bi | Out, Hi |
| 1 | SCSI_MSG# | Bi | 1 | IDED[121 | Bi | Out, Hi |
| 1 | SCSI_SEL# | Bi | 1 | IDED[13] | Bi | Out, Hi |
| | SCSI_CXD# | Bi | 1 | IDED[14] | Bi | Out, Hi |
| 1 | SCSI_BSY# | Bi | 1 | IDED[15] | Bi | Tri |
| 1 | SCSI_RST# | Bi | 1 | IDERESET# | Out | Out, Lo |

TABLE 1-continued

IDE/SCSI interface

| SCSI, 8 bit | | | BMIDE | | | |
|---|---|---|---|---|---|---|
| # | Name | Type | # | Name | Type | POWER UP |
| 1 | SCSI_ACK# | In | 1 | IDEDRQ | In | Tri |
| 1 | SCSI_FACK# | Out | 1 | IDEDACK# | Out | Out, Hi |
|  | SCSI_REQ# | In | 1 | IDEIORDY | In | Tri |
| 20 |  |  | 3 | IDEA[2:0] | Out | Out |
|  |  |  | 1 | IDEIRQ# | Out | Out, Hi |
|  |  |  | 1 | IDEIOR# | Out | Out, Hi |
|  |  |  | 1 | IDEIOW# | Out | Out, Hi |
|  |  |  | 1 | CS3FX# | Out | Out, Hi |
|  |  |  | 1 | CS1FX# | Out | Out, Hi |
|  |  |  | 28 |  |  |  |

At power-up the pins shown in Table 1 are driven as indicated. The states for these pins have been selected to allow the device type attached to the IDE/SCSI interface 46 of FIG. 1 to be unknown at power on. All command lines are driven inactive for both types of drives, as can be seen.

The SCSI and IDE interfaces share common pins on the interface 46. At the PCI input interface, the 32-bit wide PCI signals are applied over the bus 10 to a PCI bus interface 12, which has master 14 and slave 16 sections. The master section 14 is coupled to supply control signals to and to receive control signals from a bus master descriptor tables section 18; and also, data is passed between the master 14 and the bus master descriptor tables 18.

On the slave 16 of the PCI bus interface 12, control signals are supplied to a decode circuit 20 for the configuration registers input/output (I/O), which also is interconnected with the bus master descriptor tables 18. In addition to the standard PCI configuration registers, the configuration register logic 20 has a mode control register and ICE and SCSI state machine control registers. The mode control register supplies a mode signal on a lead 22, which determines the function of the pins on the output of the IDE/SCSI interface 46. This mode signal 22 is applied to the interface circuit 46 as well as to a write FIFO buffer memory 26 and a read FIFO buffer memory 28. In addition, the mode selection signals over the lead 22 are supplied to a FIFO control multiplex circuit 30, which in turn is coupled with an IDE state machine 40 and an SCSI state machine 42. Whichever one of the state machines 40 or 42 is used for controlling the read and write strobes to the FIFO buffer memories 26 and 28 is selected by the operation of the multiplex circuit 30 in response to the mode signal over the output 22 from the configuration register 20.

From an examination of the circuit described thus far, it is apparent that the SCSI and IDE devices which are connected to the bus 100 or pins of the interface 46 share the write FIFO buffer memory 26, the read FIFO buffer memory 28, the PCI bus master interface 12, 14, 16 and most of the configuration and I/O decode logic. Sharing these blocks saves a considerable amount of logic, and therefore chip real estate and costs over prior systems, which employed independent blocks for the IDE and SCSI interfaces.

As mentioned above, the PCI interface at 10 is a 32-bit wide interface. The data to and from the IDE drives (when an IDE drive connection is made) is 16 bits wide. Data to and from the SCSI drives (when an SCSI drive connection is made to the interface circuit 46) is 8 bits wide for a worst-case example. Some versions of SCSI exist that are 8 bits wide or 16 bits wide. For SCSI drives, the CHRP reference platform specifies an 8-bit with parity interface.

Because of these differences, the requirement is that in the case of an IDE transfer between the PCI interface 10 and the IDE device coupled to the interface circuit 46, data from the IDE drive is converted from 16-bit data to 32-bit data; and data from the PCI interface 10 is converted from 32-bit data to 16-bit data as the data is transferred through the interface. In the case of an SCSI data transfer, data from the SCSI drive is converted from 8-bit wide data to 32-bit wide data for application to the PCI interface 10. Similarly, data from the PCI interface 10 is converted from 32-bit wide data to 8-bit wide data by the interface circuit shown in FIG. 1.

Because all of the data transfers involve 32 bits for the PCI bus 10, the preferred embodiment of the invention, as shown in FIG. 1, uses 32-bit wide FIFOs for the write FIFO buffer memory 26 and the read FIFO buffer memory 28. The width of the data then is adjusted as required at the output of the write FIFO 26 and at the input of the read FIFO 28 for passing the data through the system. An assumption can be made that all data transfers which use the FIFO buffer memories 26 and 28 are divisible by 4, and that there is no requirement to transfer partial 32-bit long word quantities, (that is all four bytes are always transferred and all four bytes are always used). As described in conjunction with FIG. 2, a bypass exists to allow 8-bit command and status values to bypass the FIFOs 26 and 28 as required. Such bypass paths also can be used for odd-sized transfers, if any should exist.

As shown in FIG. 1, the configuration registers 20 respond to signals from the slave section 16 of the PCI bus interface 12 to determine whether the interface is with an IDE or SCSI drive. Control signals at the output of the configuration registers are applied to the IDE state machine 40 and the SCSI state machine 42, in accordance with the desired selection. These signals are applied over the leads 41 and 43 to the state machines 40 and 42, respectively, from the corresponding outputs of the configuration registers 20. The various other command signals from the configuration register 20, such as I/O write number, I/O read number, address, and I/O select number (by way of example) all are applied to both of the state machines 40 and 42 in parallel. Only one of these two state machines, however, is in operation at any given time, in accordance with the control signals applied over the leads 41 and 43; so that only the selected state machine responds to the other signals from the configuration register 20.

The mode direction/mode control signal over the lead 22 also configures the write FIFO buffer memory 26 and the read FIFO buffer memory 28 in accordance with the conversion bit width of the signals required for either the IDE or SCSI selection, as determined from the operation of the configuration register 20. This mode control signal also determines the interconnections between whichever one of the state machines 40 or 42 is to be operated through the write/read control buffer 30 to supply the "read" signals from the selected state machine 40 or 42 to the write FIFO buffer memory 26 and the read FIFO buffer memory 28.

Also, as shown in FIG. 1, signals are obtained from the buffer memories 26 and 28 to indicate when these memories are empty or full. These signals are grouped as signals 36 from the write FIFO buffer memory 26 and as the signals 38 from the read FIFO buffer memory 28. These outputs from both of the buffer memories 26 and 28 are applied in parallel to the IDE state machine 40 and the SCSI state machine 42 for normal operation of those state machines.

It should be noted that the details of the state machines 40 and 42 are not illustrated in FIG. 1, since these state machines operate in conventional manner. The circuit of Figure simply illustrates the manner in which the control of the state machines is effected in order to provide a universal CHRP platform interface between the PCI bus at 10 and either an IDE or SCSI drive coupled to the pins of the interface circuit 46.

The IDE state machine 40 is typical of a state machine used to interface the FIFO buffer memories 26 arid 28, the PCI bus master logic 14 and the PCI slave logic 16 (configuration registers, I/O reads and writes) to the IDE disk drive interface 46. The SCSI state machine 42 also is typical of a state machine used to interface the write and read FIFO buffer memories 26 and 28, the PCI bus master logic, the PCI slave logic 16 (configuration registers, I/O reads and writes) to the SCSI disk drive interface 46.

The details of the individual state machines 40 and 42 are not important to the invention shown in FIG. 1. The state machines are shown only to explain the overall operation of the IDE/SCSI multiplex at the interface 46 and the control circuit 30. Table 1 details the outputs of the two state machines and their interface to the multiplex which drives the IDE or SCSI interface. The definition of the signals to the IDE or SCSI drives is detailed in Table 1.

As shown in FIG. 1, the 32-bit wide PCI data signals are applied over a bus 30 to the write FIFO buffer memory 26 and from the read FIFO buffer memory 28. The I/O control of the buffer memories 26 and 28 is applied over a lead 24 from the configuration register 20. The bus master control is applied from the bus master 18 over a lead 31 to the buffer memories 26 and 28 to cause these memories to operate in a conventional manner in response to these signals.

Figure 2:
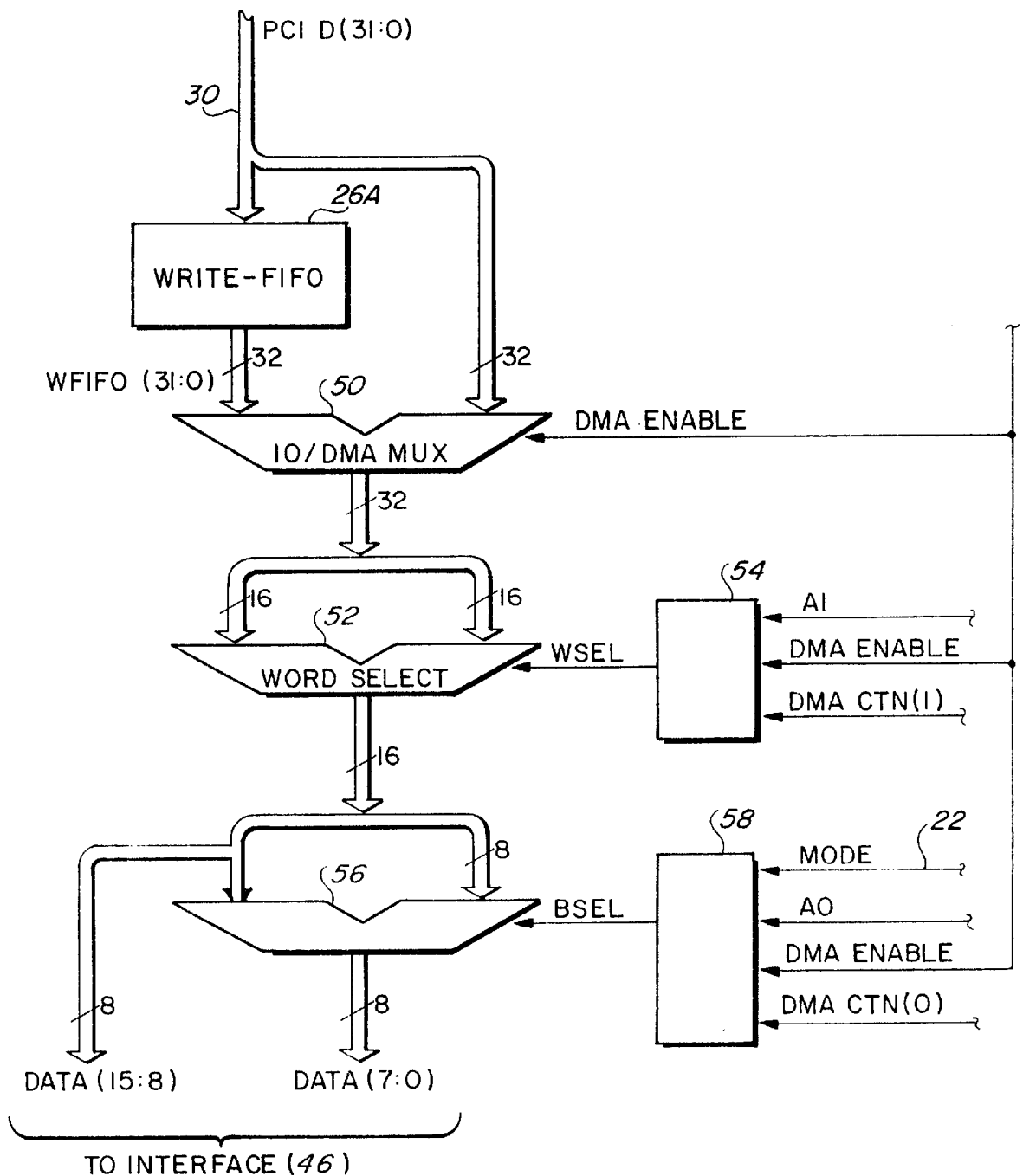
FIG. 2 is a detail of a portion of the circuit of FIG. 1.

Reference now should be made to FIG. 2, which illustrates one possible implementation of the write FIFO buffer memory 26 which may be used in conjunction with the system shown in FIG. 1. It should be noted that a similar reverse configuration for the read FIFO buffer memory 28 also may be employed. Since the write FIFO buffer memory 26 and the read FIFO buffer memory 28 operate in a similar manner in the transfer of data between the PCI interface 10 and whichever one of the IDE or SCSI drives are connected to the interface 46, only the write FIFO buffer memory is shown in FIG. 2.

As described previously, the write FIFO buffer memory is a 32-bit wide FIFO, shown in FIG. 2 as write FIFO 26A. The depth of the write FIFO 26A is a system-dependent option. For most applications, a FIFO having five 32-bit (4-byte) entries is adequate. It should be noted in FIG. 2 that the FIFO 26A may be bypassed by using an input/output DMA multiplex,.shown in FIG. 2 as an I/O/DMA multiplex gate 50. This multiplex 50 routes the output of the write FIFO buffer memory 26A to the next stage whenever DMA is enabled from a conventional source in the computer system with which the interface circuit of FIG. 1 is employed.

The write FIFO 26A is used only for bus master operations (as determined by the bus master control signals over the lead 31 of FIG. 1), during which all data is transferred in DMA (Direct Memory Access) mode. Data either is moved by bus master cycles or by I/O cycles, as determined by the output over the lead 24 from the bus master state machine in the bus master block 18. Bus master cycles only use DMA cycles to move data and always use the FIFO buffer memories 26 and 28 for data buffering. Input/output (I/O) cycles never use the buffer memories 26 and 28 and are able to bypass them.

As shown in FIG. 2, the DMA enable signal to the I/o/DMA multiplex 50 selects the output of the write FIFO buffer memory 26A when the system is in its DMA (bus master) mode. This allows the remaining multiplexes 52 and 56, shown in FIG. 2, to be shared for both DMA and I/O cycles.

A word select multiplex 52 is used to select between the high and low order halves of the 32-bit long word, shown as applied to the two inputs of the multiplex 52 in two 16-bit wide portions. The word select multiplex is controlled by input Al for I/O operations and by the CNT[1] bit [the bit next to the least significant bit, (LSB)] of the DMA counter internal to the bus master state machine (not shown, since this counter is conventional). The signal Al and others connect from the bus master circuit 18 over the bus M-control input 31, shown in FIG. 1, to the FIFO memories 26 and 28. For (non DMA) slave accesses, AO and Al are address bits from the host PCI bus interface, slave 16 side.

The final multiplex in the circuit of FIG. 2 is the byte multiplex 56. This multiplex is used for I/O transfers to IDE drives and for all transfers for SCSI drives (DMA and I/O). When the system is operated in the IDE mode, and also in the DMA mode, all 16 bits are valid at the output of the word select multiplex 52; so that the byte multiplex 56 always selects input "A" (the least significant bits), while the upper 8 bits always bypass the multiplex 56, as indicated in FIG. 2. This effectively is the same as if the multiplex 56 was not present in the circuit, and the output of the word select multiplex was applied directly to the IDE data pins through the interface circuit 46.

In the IDE mode, and with DMA enable not active, I/O cycles can be performed. The AO input from the PCI bus slave interface 16 then is used to select between the A and B inputs of the byte multiplex 56 to route the correct portion of the 32-bit byte to the IDE drive pins.

When the mode signal 22 selects the SCSI drive, the byte multiplex 56 always is active. In the DMA mode, the least significant bits (LSB) of a DMA counter are used to select the byte; and in the non-DMA mode (I/O cycles can be performed), AO selects the byte from the word select multiplex 52. This behavior is shown in the following table:

TABLE 2

| Drive Mode | DMA enable | Transfer Type | From PCI Slave | | DMA counter LSBs | | Data Select | | | | Notes |
|---|---|---|---|---|---|---|---|---|---|---|---|
| | | | A1 | A0 | C1 | C0 | WSEL | BSEL | Data from | Data to | |
| SCSI | False (0) | IO Write to SCSI interface | 0 | 0 | X | X | 0 | 0 | PCI D[7:0] | Data [7:0] | |
| | | | 1 | 1 | X | X | 0 | 1 | PCI D[15:8] | Data [7:0] | |
| | | | 1 | 0 | X | X | 1 | 0 | PCI D[23:16] | Data [7:0] | |
| | | | 1 | 1 | X | X | 1 | 1 | PCI D[31:24] | Data [7:0] | |

TABLE 2-continued

| Drive Mode | DMA enable | Transfer Type | From PCI Slave A1 A0 | DMA counter LSBs C1 C0 | Data Select WSEL | BSEL | Data from | Data to | Notes |
|---|---|---|---|---|---|---|---|---|---|
| SCSI | True (1) | DMA Write to SCSI interface | X X | 0 0 | 0 | 0 | WFIFO[7:0] | Data [7:0] | |
|  |  |  | X X | 0 1 | 0 | 1 | WFIFO[15:8] | Data [7:0] | |
|  |  |  | X X | 1 0 | 1 | 0 | WFIFO[23:16] | Data [7:0] | |
|  |  |  | X X | 1 1 | 1 | 1 | WFIFO[31:24] | Data [7:0] | |
| IDE | False (0) | IO Write to IDE interface | 0 0 | X X | 0 | 0 | PCI D[7:0] | Data [7:0] | |
|  |  |  | 0 1 | X X | 0 | 1 | PCI D[15:8] | Data [7:0] | |
|  |  |  | 1 0 | X X | 1 | 0 | PCI D[23:16] | Data [7:0] | |
|  |  |  | 1 1 | X X | 1 | 1 | PCI D[31:24] | Data [7:0] | |
| IDE | True (1) | DMA Write to IDE interface | X X | 0 X | 0 | X | WFIFO[15:0] | Data [15:0] | |
|  |  |  | X X | 0 X | 0 | X | Invalid | Invalid | Invalid |
|  |  |  | X X | 1 X | 1 | X | WFIFO[31:16] | Data [15:0] | |
|  |  |  | X X | 1 X | 1 | X | Invalid | Invalid | Invalid |

From an examination of Table 2 above, it can be seen that when the system is in the SCSI mode, the DMA counter increments by one for every byte transferred, and when the system is in the IDE mode and DMA mode, the DMA counter increments by two for every word transferred. As noted above, the read FIFO buffer memory 28 performs functions which are complementary to the write FIFO buffer memory 26, shown in FIG. 2, with a complementary data flow from that shown in Table 2 and in FIG. 2.

The foregoing description of the preferred embodiment of the invention is to be considered as illustrative and not as limiting. Various changes and modifications will occur to those skilled in the art for performing substantially the same function, in substantially the same way, to achieve substantially the same result without departing from the true scope of the invention as defined in the appended claims.

What is claimed is:

1. A universal disk controller for microprocessor systems capable of use as a PCI interface with both SCSI drives and IDE drives, said controller including in combination:
   a PCI bus master interface;
   configuration logic coupled with said PCI bus master interface and having a mode control output for controlling the operating mode of said disk controller in response to configuration signals supplied thereto from said PCI bus master interface;
   a write FIFO buffer memory coupled with said PCI bus master interface to receive data therefrom;
   a read FIFO coupled with said PCI bus master interface to supply data thereto;
   an IDE state machine having inputs coupled with said configuration logic to receive operating signals therefrom and having outputs coupled with said write and read FIFO buffer memories to control the operation thereof;
   an SCSI state machine having inputs coupled with said configuration logic to receive operating signals therefrom and having outputs coupled with said write and read FIFO buffer memories to control the operation thereof;
   an IDE/SCSI drive interface coupled with said write FIFO buffer memory to receive signals therefrom, coupled with said read FIFO buffer memory to supply signals thereto, and further coupled with said state machines to receive signals therefrom and to supply signals thereto, said IDE/SCSI drive interface having common pins for connection to either SCSI drives or IDE drives; and
   mode control inputs for said write FIFO buffer memory, said read FIFO buffer memory, said IDE and SCSI state machines and said IDE/SCSI drive interface, each of said mode control inputs coupled with said mode control output of said configuration logic for configuring said write FIFO buffer memory, said read FIFO buffer memory, said state machines and said IDE/SCSI drive interface for selecting one of said SCSI and IDE drives through said common pins.

2. A universal disk controller according to claim 1 wherein said write FIFO buffer and said read FIFO buffer memory are configured as 32-bit wide memories for transferring data to and receiving data from said PCI bus master interface.

3. The combination according to claim 2 wherein said mode control output from said configuration logic coupled with said write FIFO buffer memory and said read FIFO buffer memory causes data supplied from said write FIFO buffer memory and supplied to said read FIFO buffer memory to be 16 bits wide for IDE data transfer and to be 8 bits wide for at least some SCSI data transfers.

4. The combination according to claim 3 wherein operation of said disk controller between a PCI interface and one of said SCSI and IDE drives is selected automatically by said mode control output of said configuration logic.

5. The combination according to claim 4 wherein said IDE/SCSI drive interface is selectively controlled by one of said IDE state machine and SCSI state machine, with signals passing to and from said selected state machine and said IDE/SCSI interface only.

6. The combination according to claim 1 wherein said mode control output from said configuration logic coupled with said write FIFO buffer memory and said read FIFO buffer memory causes data supplied from said write FIFO buffer memory and supplied to said read FIFO buffer memory to be 16 bits wide for IDE data transfer and to be 8 bits wide for at least some SCSI data transfers.

7. The combination according to claim 1 wherein operation of said disk controller between a PCI interface and one of said SCSI and IDE drives is selected automatically by said mode control output of said configuration logic.

8. The combination according to claim 1 wherein said IDE/SCSI drive interface is selectively controlled by one of said IDE state machine and SCSI state machine, with signals passing to and from said selected state machine and said IDE/SCSI interface only.

* * * * *